United States Patent
Cantini et al.

(10) Patent No.: US 7,801,492 B2
(45) Date of Patent: *Sep. 21, 2010

(54) SYSTEM AND METHOD FOR MANAGING RESOURCES OF PORTABLE MODULE RESOURCES

(75) Inventors: Renato Cantini, Belfaux (CH); Karin Busch Lauper, Bern (CH); Roger Lagadec, Regensdorf (CH)

(73) Assignees: Swisscom AG, Bern (CH); NagraCard S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/347,333

(22) Filed: Dec. 31, 2008

(65) Prior Publication Data

US 2009/0149209 A1   Jun. 11, 2009

Related U.S. Application Data

(63) Continuation of application No. 10/511,610, filed as application No. PCT/CH03/00288 on May 5, 2003, now Pat. No. 7,509,098.

(30) Foreign Application Priority Data

May 6, 2002   (EP) .................................. 02405370

(51) Int. Cl.
| | |
|---|---|
| H04B 1/38 | (2006.01) |
| H04B 7/00 | (2006.01) |
| H04M 3/00 | (2006.01) |
| H04M 1/68 | (2006.01) |
| H04M 1/00 | (2006.01) |
| H04M 1/66 | (2006.01) |
| H04L 12/58 | (2006.01) |
| H04W 4/00 | (2009.01) |
| H04K 1/00 | (2006.01) |
| H04H 20/71 | (2008.01) |
| H04H 40/00 | (2008.01) |

(52) U.S. Cl. .................. 455/73; 455/3.01; 455/3.06; 455/419; 455/557; 455/558; 455/418; 455/550.1; 455/412.1; 455/410; 455/411; 455/432.3; 455/435.1; 455/500; 380/247

(58) Field of Classification Search ................ 455/3.01, 455/3.06, 73, 419, 557–558, 418, 550.1, 455/412.1, 410, 411, 432.3, 435.1, 500; 380/247
See application file for complete search history.

(56) References Cited

U.S. PATENT DOCUMENTS 5,493,692 A * 2/1996 Theimer et al. ............ 455/26.1

(Continued)

FOREIGN PATENT DOCUMENTS

EP   0 817 041   1/1998

(Continued)

*Primary Examiner*—Matthew D Anderson
*Assistant Examiner*—Bobbak Safaipour
(74) *Attorney, Agent, or Firm*—Oblon, Spivak, McClelland, Maier & Neustadt, L.L.P.

(57) ABSTRACT

Proposed are a method and a system for management of resources of portable resource modules, each connected to a communication terminal, which modules comprise electronic memory units and are designed in particular as chipcards. A first resource management instruction comprising a module identification is transmitted to a resource management center. A second resource management instruction is transmitted from the resource management center via a communication network to the resource module identified through the module identification. In the particular resource module, resources are made ready or released by a resource control mechanism corresponding to the received second resource management instruction. A resource management confirmation is transmitted by the particular resource module via the communication network to the resource management center, and in the resource management center information about the resources made ready or released is stored assigned to the module identification.

14 Claims, 2 Drawing Sheets

U.S. PATENT DOCUMENTS

| | | | |
|---|---|---|---|
| 5,826,082 A * | 10/1998 | Bishop et al. | 718/104 |
| 5,920,865 A * | 7/1999 | Ariga | 1/1 |
| 6,128,690 A | 10/2000 | Purcell et al. | |
| 6,249,836 B1 | 6/2001 | Downs et al. | |
| 6,415,160 B1 | 7/2002 | Wichmann | |
| 6,453,167 B1 | 9/2002 | Michaels et al. | |
| 6,615,057 B1 | 9/2003 | Pettersson | |
| 6,687,800 B1 * | 2/2004 | Nassor | 711/159 |
| 6,760,605 B1 | 7/2004 | Vannel et al. | |
| 6,961,587 B1 | 11/2005 | Vilppula et al. | |
| 6,976,011 B1 | 12/2005 | Capitant et al. | |
| 6,978,006 B1 | 12/2005 | Polcyn | |
| 7,016,669 B2 | 3/2006 | Aerrabotu et al. | |
| 7,039,403 B2 | 5/2006 | Wong | |
| 7,054,592 B2 * | 5/2006 | Tatsumi et al. | 455/3.06 |
| 7,127,264 B2 * | 10/2006 | Hronek et al. | 455/466 |
| 7,185,015 B2 * | 2/2007 | Kester et al. | 707/10 |
| 7,191,159 B2 * | 3/2007 | Horvitz | 706/1 |
| 7,194,681 B1 * | 3/2007 | Horvitz | 715/236 |
| 7,194,755 B1 * | 3/2007 | Nakata et al. | 725/78 |
| 7,308,511 B2 | 12/2007 | Wilson et al. | |
| 2001/0010685 A1 * | 8/2001 | Aho | 370/329 |
| 2004/0067772 A1 | 4/2004 | Gaumain | |
| 2004/0078571 A1 | 4/2004 | Haverinen | |
| 2009/0149209 A1 * | 6/2009 | Cantini et al. | 455/509 |

FOREIGN PATENT DOCUMENTS

| | | |
|---|---|---|
| GB | 2 342 470 | 4/2000 |
| JP | 2002-24598 | 3/2002 |
| WO | 99/53401 | 10/1999 |
| WO | 01/29686 | 4/2001 |
| WO | WO 02/03732 A1 | 1/2002 |

* cited by examiner

SYSTEM AND METHOD FOR MANAGING RESOURCES OF PORTABLE MODULE RESOURCES

CROSS-REFERENCE TO RELATED APPLICATIONS

This application is a continuation Application of, and claims the benefit of priority under 35 U.S.C. §120 from, U.S. application Ser. No. 10/511,610, filed Apr. 18, 2005, herein incorporated by reference, which claims the benefit of priority under 35 U.S.C. §119 from Europe Patent Application No. 02405370.4, filed May 6, 2002.

TECHNICAL FIELD

The present invention relates to a system, a method and a management centre for managing resources of portable resource modules. The system relates in particular to a system, a method and a management centre for managing resources of a multiplicity of portable resource modules, each being connected to a communication terminal and each comprising a resource control mechanism for making ready and releasing resources in the respective resource module, the resources comprising electronic memory units, and which portable resource modules are designed in particular as chipcards.

BACKGROUND ART

Portable resource modules comprising electronic data stores and program stores as well as one or more processors are known and are designed conventionally with interfaces for removable connection to a host device. Via this removable connection, a portable resource module and a host device can be hooked up for temporary interaction and co-operation. The host device can access data stores in the portable resource module, for example, or co-operate with a software application, which is executed on a processor of the portable resource module. The known portable resource modules are typically designed in the form of so-called chipcards, but they can also be designed differently, for instance as so-called electronic tokens. Among the most well known chipcards are the SIM cards (Subscriber Identity Module), which is removably connectable to a mobile radio telephone as an identification and authentication module, and the bancomat card which is removably connectable to bancomats or so-called ATMs (Automatic Teller Machines). Along with the progress in miniaturisation of electronic components, the memory capacity and the processor capacity of portable resource modules have been continuously enlarged, so that it has become realistic to use the resource modules not merely for a dedicated application but for a plurality of applications. In particular, in connection with communication terminals, with networked host devices and with suitable writing devices, it has become possible moreover for authorised parties to transmit additional software applications dynamically onto the portable resource modules, store them there, and execute them on the local processor. Increased security problems have thereby arisen, however, since the possibility has existed that additionally loaded software applications could access data of other software applications in the portable resource module in an unauthorised way.

Described in the patent application EP 0 908 855 is a resource control mechanism for chipcards having a plurality of software applications, which mechanism makes available resources for the software applications in the chipcard and prevents data of other software applications in the card from being accessed in an unauthorised way. If the chipcard is connected to a host device, the resource control mechanism according to EP 0 908 855 makes it possible to receive requests from the host device for the execution of the software applications, to provide, by means of a memory area table stored in the chipcard, a memory area for the storage and for the execution (inclusive data storage) of a respective software application as resources and to check that the respective software application is executed in the resources made ready therefor. The resource control mechanism according to EP 0 908 855, however, cannot prevent redundant, i.e. already available, software applications from being loaded onto the chipcard or unnecessary loading attempts from being made for additional software applications when no resources therefor are available on the chipcard. This is a drawback in particular if software applications are supposed to be loaded onto a multiplicity of resource modules via a communication network since network and storage capacity are thereby wasted unnecessarily.

DISCLOSURE OF INVENTION

It is an object of the present invention to propose a new system, a method and a management centre for management of resources of portable resource modules, which do not have the drawbacks of the prior art and which make possible in particular the management of resources of a multiplicity of portable resource modules.

These objects are achieved according to the present invention in particular through the elements of the independent claims. Further advantageous embodiments follow moreover from the dependent claims and from the description.

The portable resource modules, designed in particular as chipcards, are each connected to a communication terminal and each comprise a resource control mechanism for making ready and releasing resources in the respective resource module, the resources comprising electronic memory units.

The above-mentioned objects are achieved through the present invention in particular in that a first resource management instruction comprising a module identification, i.e. a first request for making ready or releasing hardware resources, e.g. storage space, or software resources, e.g. software applications, is transmitted to a resource management centre, in that a second resource management instruction is transmitted from the resource management centre via a communication network to the resource module identified through the module identification, in that resources are made ready or released through a resource control mechanism in the identified resource module according to the received second resource management instruction, in that a resource management confirmation is transmitted from the identified resource module via the communication network to the resource management centre, and in that information about the resources made ready or released is stored, assigned to the module identification, in the resource management centre. The advantage of sending requests for making ready or releasing resources of a portable resource module via a resource management centre and of storing there information for the respective resource module about the resources made ready or released is that the resources of all participating resource modules or at least defined portions of these resources can be managed in a centralized way. That means that in the resource management centre it can be determined which memory areas of a particular resource module have already been made ready, i.e. occupied or reserved, or are still free, and which software applications have been made ready, i.e. loaded. A centralized distribution and updating of software applications in the portable resource modules is thereby made possible without already available applications having to be loaded another time and without unnecessary loading attempts having to be made via the communication network if the storage space necessary therefor is not free. The centralized management of resources of resource modules makes it possible furthermore to make available to a third party resources for use by this third party. For example, a defined memory area can be reserved for software applications of an interested third party.

In an embodiment variant, the module identification and an application request are transmitted by the user of the communication terminal to an application management unit, the first resource management instruction is transmitted based on the received application request by the application management unit to the resource management centre, the first resource management instruction comprising a resource user identification, and the resource user identification being stored, assigned to the module identification, in the resource management centre. The advantage of sending the application request and the module identification via an application management unit to the resource management centre is that the user is able to request different software applications from a plurality of independent vendors, who each operate an application management unit, these vendors being able to avail of the centralized services of the joint resource management centre, where they are registered as resource users.

In an embodiment variant, a resource preparation confirmation is transmitted from the resource management centre to the application management unit, an application installation request is transmitted from the application management unit via the communication network to the particular resource module, an application is installed in the particular resource module through the resource control mechanism in accordance with the application installation request using the resources made ready, and information about the installed application is stored in the application management unit, the information being stored assigned to the module identification. The advantage of this embodiment variant is that the operator of the application management unit, typically the vendor of the software applications, has complete control over the software applications offered by him and over the installation of these software applications, and nevertheless the centralized services of the resource management centre can be availed of.

In an embodiment variant, in the resource management centre, an application installation request is inserted into the second resource management instruction, an application is installed in the particular resource module through the resource control mechanism in accordance with the application installation request, and information about the installed application is stored in the resource management centre, the information being stored assigned to the module identification. The advantage of this embodiment variant is that the implementation of the application management unit is simplified since the delivery of the requested software application to the resource module is also carried out by the resource management centre.

In an embodiment variant, the communication address of the communication terminal is determined from a data store in which module identifications and communication addresses assigned to these module identifications are stored. The advantage of mapping module identifications in communication addresses, e.g. call numbers, is that the resource management centre and the application management unit only need to have the module identification of the resource module indicated to them, and the current communication address of the communication terminal with which the resource module is connected at the time can be determined, preferably in an address mapping unit in the communication network.

BRIEF DESCRIPTION OF THE DRAWINGS

An embodiment of the present invention is described in the following with reference to an example. The example of the embodiment is illustrated by the following attached figures.

MODES FOR CARRYING OUT THE INVENTION

Figure 1:
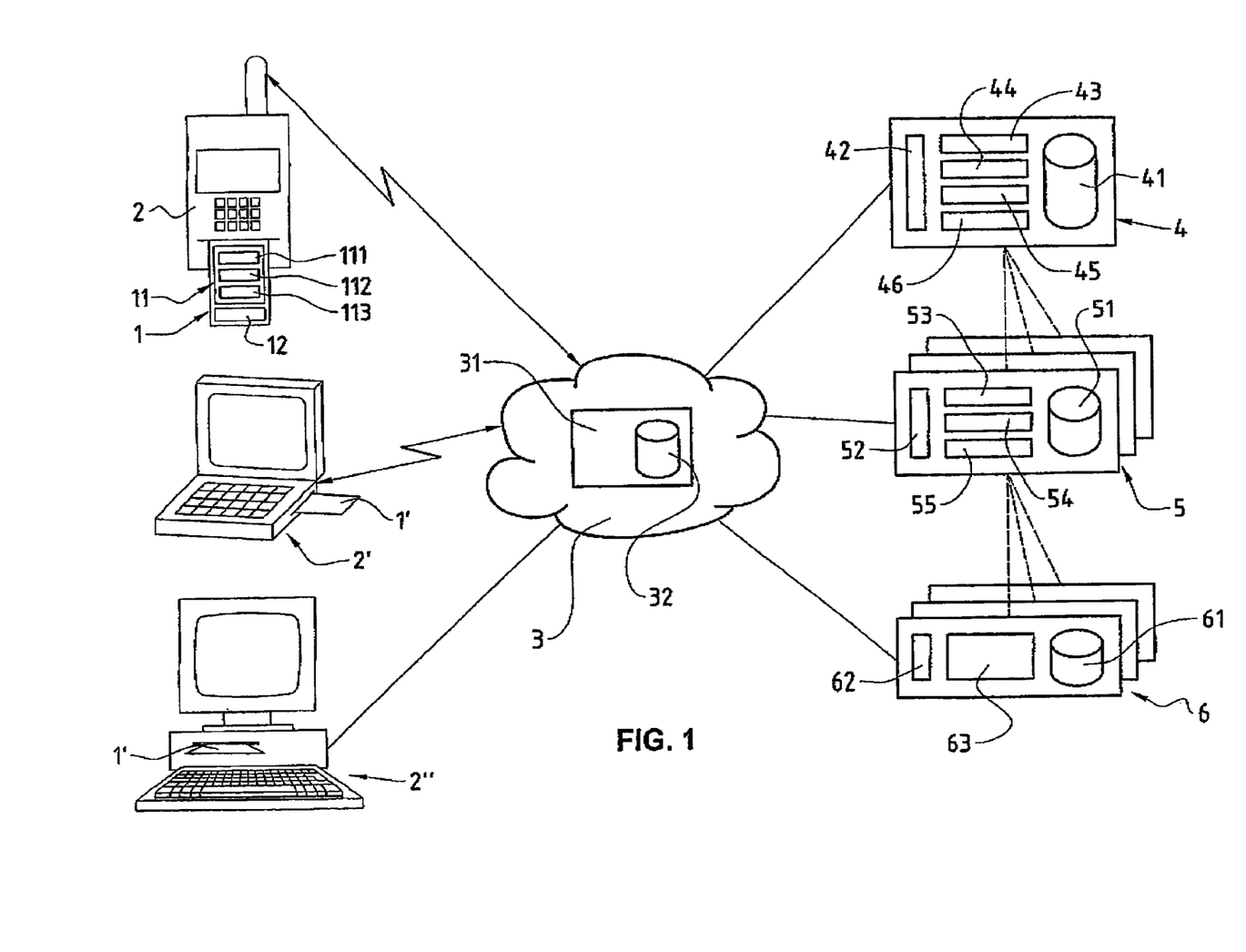
FIG. 1 shows a block diagram of a system for management of resources of portable resource modules in which schematically represented are different communication terminals with resource modules connected via a communication network to a resource management centre and an application management unit.
Figure 2:
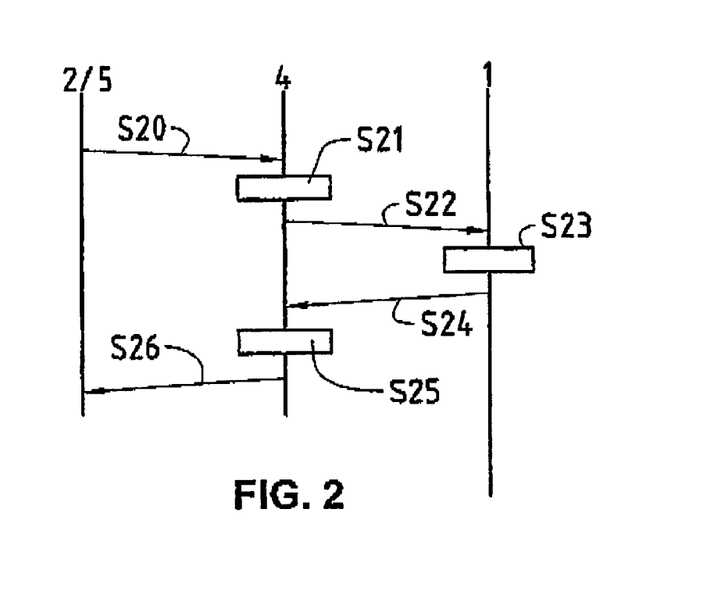
FIG. 2 shows a time diagram representing the procedural sequence at the resource management, the exchange of data between an application management unit, or respectively a communication terminal, the resource management centre and a resource module being shown for the case where the application management unit does not participate in the delivery of the requested software applications.
Figure 3:
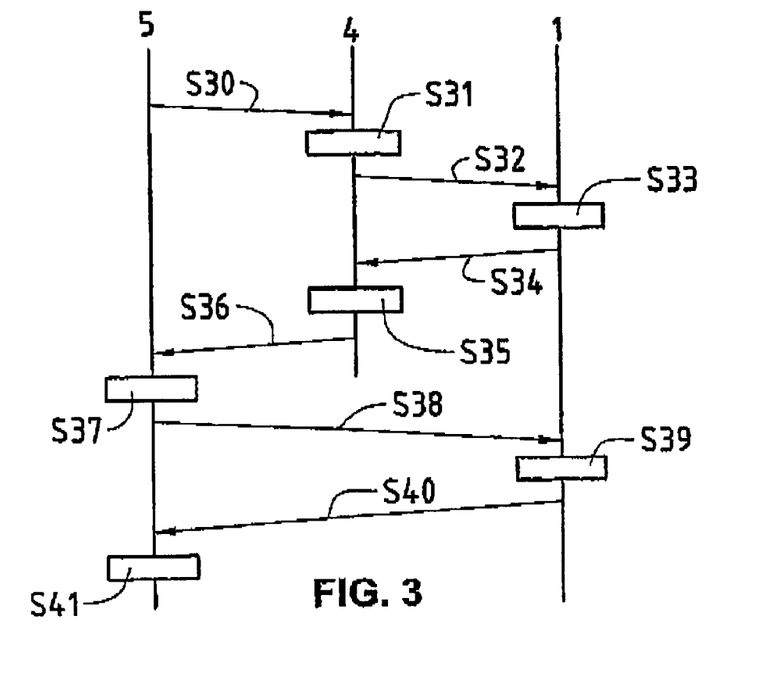
FIG. 3 shows a time diagram representing the procedural sequence at the resource management, the exchange of data between an application management unit, the resource management centre and a resource module being shown for the case where the application management unit is responsible for delivery of the requested software applications.

In FIGS. 1, 2 and 3, same components corresponding to one another are designated by the same reference numerals. In FIG. 1, the reference numerals 1 and 1' refer to portable resource modules corresponding to one another, only the resource module designated by the reference numeral 1 being shown in detail, however. The resource module 1 comprises an electronic memory 11 with a plurality of memory units for storage of data and software programs 111, 112, 113 as well as at least one processor 12 connected to the electronic memory 11.

In FIG. 1, the reference numeral 3 refers to a communication network comprising a mobile radio network and/or a fixed network. The mobile radio network is, for example, a GSM (Global System for Mobile Communication) or a UMTS network (Universal Mobile Telephone System) or another, for instance satellite-based, mobile radio network. The fixed network is e.g. the public switched telephone network or an ISDN network (Integrated Services Digital Network).

The reference numerals 2, 2', 2" in FIG. 1 designate different communication terminals connectable to the communication network 3, with which terminals the resource modules 1, 1' are removably connected. The communication terminal 2 is a mobile radio telephone. The communication terminal 2' is a laptop or a PDA computer (Personal Digital Assistant) with a communications module for the communication via a mobile radio network. The communication terminal 2", for instance a PC (Personal Computer), comprises a communications module for communication via a fixed network.

The resource module 1 comprises a resource control mechanism 111 for making ready and releasing resources of the resource module 1. The resource control mechanism 111 is preferably designed as programmed software module, and receives resource management instructions via the communication terminal 2, with which it is connected. Resource management instructions comprise instructions for making ready and releasing hardware and software resources such as memory space reservation, memory space release, application installation or application removal. The resource control mechanism 111 also comprises in particular programmed software functions for installing an application in the resource module 1 in accordance with an application installation request received with a resource management instruction. The resource control mechanism 111 keeps a memory area table in which memory areas made ready of the electronic memory 11 are reserved or installed software applications are assigned. The resource control mechanism 111 prevents software applications from accessing data of other software applications in an unauthorised way.

The resource module 1 comprises a confirmation module 112 for transmitting via the communication network 3 to the unit from which a resource management instruction was received a resource management confirmation relating to resources which have been made ready or released through the resource control mechanism 111 in accordance with a received resource management instruction. The confirmation module 112 is preferably designed as a programmed software module and carries out the data communication via the communication network 3 with the aid of the communication functions of the connected communication terminal 2.

The resource module 1 comprises moreover software resources 113 (application) which have already been stored during manufacture of the resource module 1 or are stored at a later point in time in the electronic memory 11 of the resource module 1.

The reference numeral 4 in FIG. 1 refers to a resource management centre comprising one or more computers connected to the communication network 3. For the connection and the data exchange with and over the communication network 3, the resource management centre 4 comprises a communications module 42 with the hardware and software components necessary therefor.

The resource management centre 4 comprises a receiving module 43 for receiving resource management instructions. The resource management instructions contain a module identification, identifying a particular resource module or a particular group of resource modules 1, 1', to which the respective resource management instruction relates, and data about the resources which are supposed to be made ready or released, for instance a memory area, an application identification and/or a software application. Depending upon the embodiment variant, the resource management instructions can be received from a user or from an application management unit 5 via the communication network 3. As indicated in the figure by means of the broken lines, a direct connection can also exist between the resource management centre 4 and the application management unit 5 (the resource management centre 4 and an application management unit 5 can be implemented on a common computer, for instance). The receiving module 43 is preferably implemented as a programmed software module.

The resource management centre 4 comprises a management instruction module 44 for transmitting a resource management instruction over the communication network 3 to a particular resource module or a particular group of resource modules 1, 1'. The resource management instruction is drawn up by the management instruction module 44 based on the resource management instruction received in the receiving module 43, and is transmitted to the resource module(s) 1, 1' identified through the module identification. The drawn up resource management instruction contains data about the resources which are supposed to be made ready or released, for instance a memory area. Depending upon the embodiment variant, the management instruction module 44 can also insert an application installation request into the resource management instruction comprising an application identification and/or a software application. Before a resource management instruction is transmitted to a resource module by the management instruction module 44, the management instruction module 44 checks in the data store 41, described in the following, whether the respective resource module 1 has available sufficient free resources. The management instruction module 44 is preferably implemented as a programmed software module.

The resource management centre 4 further comprises a management module 45 and a data store 41 for storing information about the resources made ready or released, the information being stored in each case assigned to the module identification of the respective resource module 1. The data store 41, which is implemented in each case as database on a separate or a common computer, contains data, also assigned in each case to a module identification, about available software and hardware resources, installed in a standard way, of the resource module 1, or a module type from which these data can be derived by means of module profiles. Data about hardware resources comprise information about memory size, available interfaces and processors. Data about software resources comprise information about available cryptographic keys, cryptographic functions and other software programs. If the original resource management instruction has been received from an application management unit 5, the information mentioned above are stored in the data store 41, also in a way assigned to a resource user identification identifying the application management unit 5. The management module 45 is preferably implemented as a programmed software module.

Finally, the resource management centre 4 also comprises a confirmation module 46 for transmission of a resource preparation confirmation to the application management unit 5 from which the resource management instruction has been received, if applicable. The confirmation module 46 is preferably implemented as a programmed software module.

The application management unit 5 comprises a communications module 52 with the necessary hardware and software components for data exchange over the communication network 3. Application requests from an interested user of the communication terminal 2 are received via the communications module 52 and are accepted in the application management unit 5 through corresponding programmed software functions. Also received from the user, in addition to the application request comprising an application identification, is the module identification of the resource module 1 in which the software application is supposed to be installed.

As is shown schematically in FIG. 1, application requests can also be transmitted from the user to the application management unit 5 via one of a plurality of application vendor units 6. The application vendor units 6 each comprise at least one computer, a communications module 62 with the necessary hardware and software components for the data exchange over the communication network 3, a data store 61 in which module identifications and application identifications assigned to these module identifications are stored, and a software module 63 for receiving application requests, for forwarding application requests to a responsible application management unit 5 and for storing the mentioned information in the data store 61. The hierarchical organisation of application management units 5 and application vendor units 6 makes possible the flexible division of resource responsibilities and resource distribution among different operators of these units. The data exchange between the application management units 5 and the application vendor units 6 takes place over the communication network 3 or, as indicated by the broken lines in FIG. 1, via a direct connection (an application management unit 5 and an application vendor unit 6 can be implemented on a common computer, for instance).

The application management unit 5 comprises programmed software functions for transmitting a resource management instruction to the resource management centre 4 based on a received application request. The respective module identification and a resource user identification identifying the application management unit 5 are thereby inserted into the resource management instruction. For the case where the application installation request is transmitted by the resource management centre 4 over the communication network 3 to the respective resource module 1, an application identification is additionally inserted into the resource management instruction.

For the case where the application installation request is transmitted directly by the application management unit 5 over the communication network 3 to the respective resource module 1, the application management unit 5 comprises in addition an application instruction module 54 as well as an application management module 55 for storing information about the installed application, this information being stored assigned to the module identification of the respective resource module 1.

The reference numeral 31 in FIG. 1 refers to an address mapping unit, preferably a programmed software function, which, on the basis of a module identification, determines the communication address assigned to the communication terminal 2 to which the resource module 1 identified through the module identification is connected. The address mapping unit 31 has access to an address register in which communication addresses are assigned to module identifications. The address register is, for example, an HLR (Home Location Register) in which so-called IMSIs (International Mobile Subscriber Identification) are assigned to so-called MSISDN numbers (Mobile Subscriber ISDN), i.e. call numbers. Besides the IMSIs, other data elements can also be used as module identifications, for instance card numbers or chip numbers.

One skilled in the art understands that the mentioned software modules can also be implemented entirely or partially as hardware.

In the following paragraphs, the operational sequence at the resource management will be described, with reference to FIG. 2, for the case where a software application is requested and is delivered to the resource module 1 by the resource management unit 4.

In step S20, a resource management instruction is transmitted to the resource management unit 4 by the user, by means of his communication terminal 2, or by the application management unit 5. In the latter case, the resource management instruction is transmitted by the application management unit 5 based on an application request (not shown) received from the user. The resource management instruction contains the application identification for the desired software application, the module identification of the resource module 1 in which the software application is supposed to be loaded, and, if applicable, the resource user identification which is assigned to the application management unit 5.

In step S21, the received resource management instruction is handled in the resource management unit 4. Based on the received module identification and the application identification, the resource requirements for the desired software application are determined (e.g. memory space and software functions used), through consultation of the data store 41, and are compared with the resources available in the resource module 1. If sufficient resources are not available, a negative communication is transmitted to the application management unit 5 or respectively to the communication terminal 2. Otherwise a resource management instruction is prepared into which an application installation request with the desired software application (and, if applicable, with additional necessary software resources) is inserted. Installation-specific data such as start address and memory size can also be inserted into the prepared resource management instruction. In addition, the application identification, the module identification and, if applicable, the resource user identification and the installation-specific data are stored in the data store 41 assigned to one another.

In step S22, the prepared resource management instruction is transmitted by the resource management centre 4 via the communication network 3 to the resource module 1. The communication address assigned to the module identification, i.e. the call number of the communication terminal 2, is thereby determined by the address mapping unit 31.

In step S23, via the communication terminal 2, the resource management instruction is received and handled in the resource module 1. The resource control mechanism 111 reserves the necessary memory requirements and installs the software application. If the installation-specific data have not been specified already by the resource management centre 4, they are determined by the resource control mechanism 111. Then a resource management confirmation, which comprises, if applicable, installation-specific data, is prepared in the resource module 1.

In step S24, the resource management confirmation is transmitted from the resource module 1 via the communication terminal 2 and the communication network 3 to the resource management centre 4.

In step S25, based on the received resource management confirmation, the resource management centre 4 marks the software application in the data store 41 as installed and the required resources as reserved for the resource module 1.

In step S26, the resource management centre 4 transmits a confirmation to the application management unit 5 or respectively to the communication terminal 2.

If, in step S20, a resource management instruction is transmitted to the resource management unit 4 relating to the release of resources in the resource module 1, a corresponding resource management instruction is prepared in step S21 into which a resource release request is inserted, and is transmitted to the resource module 1 in step S22. In step S23, the resource control mechanism 111 releases the resources in accordance with the received resource release request. In step S25, based on a received resource management confirmation, the resource management centre 4 marks the respective resources in the data store 41 as released for the resource module 1.

In the following paragraphs, with reference to FIG. 3, the operational sequence at the resource management will be described for the case where the requested software application is delivered to the resource module by the application management unit.

In step S30, a resource management instruction is transmitted by the application management unit 5 to the resource management unit 4. The resource management instruction is transmitted by the application management unit 5 on the basis of an application request (not shown) received from the user. The resource management instruction contains data on the required resources to be made ready for the desired software application, for instance the needed memory requirements, the module identification of the resource module 1 in which the resources are supposed to be made ready, and the resource user identification which is assigned to the application management unit 5.

In step S31, the received resource management instruction is handled in the resource management unit 4. Based on the received module identification the data on the resources to be made ready are compared in the data store 41 with the resources available in the resource module 1. If sufficient resources are not available, a negative communication is transmitted to the application management unit 5. Otherwise a resource management instruction is prepared into which the data on the resources to be made ready is inserted. Further resource-specific data can be additionally inserted into the prepared resource management instruction such as start addresses or defined memory areas. In addition, the module identification, the resource user identification and the data on the resources to be made ready are stored in the data store 41 assigned to one another.

In step S32, the prepared resource management instruction is transmitted by the resource management centre 4 via the communication network 3 to the resource module 1. The communication address, i.e. the call number of the communication terminal 2, assigned to the module identification, is determined by the address mapping unit 31.

In step S33, via the communication terminal 2, the resource management instruction is received and handled in the resource module 1. The resource control mechanism 111 reserves the requested resources, for example the requested memory space. If the resource-specific data have not already been specified by the resource management centre 4, they are determined by the resource control mechanism 111. Then a resource management confirmation comprising, if applicable, resource-specific data and a resource reference, is prepared in the resource module 1.

In step S34, the resource management confirmation is transmitted to the resource management centre 4 from the resource module 1 via the communication terminal 2 and the communication network 3.

In step S35, based on the received resource management confirmation, the resource management centre 4 marks in the data store 41 the requested resources as reserved for the resource module 1, and assigns to them the received resource reference.

In step S36, the resource management centre 4 transmits a resource preparation confirmation with the resource reference to the application management unit 5.

In step S37, based on the received resource preparation confirmation, an application installation request is prepared with the desired software application and the resource reference of the resources made ready.

In step S38, the prepared application installation request is transmitted by the application management unit 5 via the communication network 3 and the communication terminal 2 to the resource module 1. The communication address, i.e. the call number of the communication terminal 2, assigned to the module identification, is determined by the address mapping unit 31.

In step S39, the application installation request is received in the resource module 1 via the communication terminal 2 and is handled. The resource control mechanism 111 installs the software application using the reserved resources identified through the resource reference. Then a confirmation is prepared in the resource module 1.

In step S40, the confirmation is transmitted from the resource module 1 via the communication terminal 2 and the communication network 3 to the application management unit 5.

In step S41, based on the received confirmation, the application management unit 5 stores in the data store 51 the application identification of the installed software application in a way assigned to the module identification of the resource module 1, and marks the software application as installed.

Finally, it should be stated that the exchange of instructions and data between the resource management centre 4 and a resource module 1, between the application management unit 5 and a resource module 1, between the resource management centre 4 and the application management unit 5 as well as between the application management unit 5 and the application vendor unit 6 preferably takes place using cryptographic security mechanisms. In particular, digital certificates employing key pairs of the PKI (Public Key Infrastructure) can be used for the identification and authentication.

INDUSTRIAL APPLICABILITY

The present invention makes possible centralized management of use of resources by a multiplicity of resource modules connected to communication terminals.

The invention claimed is:

1. A method of managing resources of chipcards connected in each case to a communication terminal, the method comprising:
    storing in a data store of a resource management centre, arranged externally to the chipcards and the communication terminals, information about resources available in each of the chipcards;
    receiving in the resource management centre via a telecommunication network a first resource management instruction for making ready resources in one or more than one selected chipcards identified in the instruction;
    checking by the resource management centre in the data store whether sufficient resources are available in the selected chipcards to meet requirements of the first resource management instruction, before transmitting a second resource management instruction;
    transmitting the second resource management instruction from the resource management centre via the telecommunication network to the selected chipcards having sufficient resources, the second resource management instruction including data about the resources to be made ready in the selected chipcards;
    making ready the resources in the selected chipcards, in accordance with the received second resource management instruction, through a resource control mechanism in the chipcard;
    transmitting a resource management confirmation from the selected chipcards via the telecommunication network to the resource management centre; and
    storing in the data store of the resource management centre information about the resources made ready in the selected chipcards, based on the resource management confirmation received from the selected chipcards.

2. The method according to claim 1, wherein the first resource management instruction comprises a module identification identifying one or more than one selected chipcards; the method further comprises determining in each case a communication address assigned to the communication terminal to which the respective chipcard identified by the module identification is connected; and the second resource management instruction is transmitted to the selected chipcards using in each case the respective communication address.

3. The method according to claim 1, wherein the resources of the chipcards include at least one of hardware resources and software resources; making ready the resources in the selected chipcards includes at least one of reserving memory areas, occupying memory areas, and loading software resources; and storing information about the resources made ready in the selected chipcards includes for a respective chipcard information about at least one of memory areas reserved, memory areas occupied, memory areas free, and software resources loaded.

4. The method according to claim 1, wherein the information stored in the data stare includes information about software resources and hardware resources available in each of the chipcards, the information about software resources including information about at least one of cryptographic keys, cryptographic functions, and other software programs available in the respective chipcard, and the information about hardware resources including information about at least one of memory size, interfaces, and processors available in the respective chipcard.

5. The method according to claim 1, wherein an application request and a module identification identifying one or more than one selected chipcards are transmitted by a communication terminal to an application management unit; the first resource management instruction includes a resource user identification and is transmitted by the application management unit to the resource management centre, based on the received application request; and the resource user identification is stored, assigned to the module identification, in the resource management centre.

6. The method according to claim 5, wherein a resource preparation confirmation is transmitted from the resource management centre to the application management unit; an application installation request is transmitted from the application management unit via the telecommunication network to one or more than one selected chipcards; an application is installed in the selected chipcards through the resource control mechanism in accordance with the application installation request using the prepared resources; and the information about the installed application is stored in the application management unit, the information being stored assigned to the module identifications.

7. The method according to claim 1, wherein in the resource management centre an application installation request is inserted into the second resource management instruction; an application is installed in one or more selected chipcards through the resource control mechanism in accordance with the application installation request, and the information about the installed application is stored in the resource management centre, the information being stored assigned to the respective chipcards.

8. A system comprising a plurality of chipcards, each connected to a communication terminal, wherein the system further comprises a resource management centre, arranged externally to the chipcards and the communication terminals, the resource management centre comprising a data store for storing information about resources available in each of the chipcards;

the resource management centre comprises a receiving module configured to receive in the resource management centre via a telecommunication network a first resource management instruction for making ready resources in one or more than one selected chipcards identified in the instruction;

the resource management centre comprises a management instruction module configured to check in the data store whether sufficient resources are available in the selected chipcards to meet requirements of the first resource management instruction, before transmitting a second resource management instruction, and to transmit the second resource management instruction via the telecommunication network to the selected chipcards having sufficient resources, the second resource management instruction including data about the resources to be made ready in the selected chipcards;

the selected chipcards each comprise a resource control mechanism for making ready resources in the respective chipcard, in accordance with the received second resource management instruction;

the selected chipcards each comprise a confirmation module configured to transmit a resource management confirmation via the telecommunication network to the resource management centre; and the resource management centre comprises a management module configured to store in the data store information about the resources made ready in the selected chipcards, based on the resource management confirmation received from the selected chipcards.

9. The system according to claim 8, wherein the first resource management instruction comprises a module identification identifying one of the chipcards; the system further comprises an address mapping module configured to determine in each case a communication address assigned to the communication terminal to which the chipcard identified by the module identification is connected; and the management instruction module is configured to transmit the second resource management instruction to the selected chipcards using in each case the respective communication address.

10. The system according to claim 8, wherein the resources of the chipcards include at least one of hardware resources and software resources; the resource control mechanism is configured to make ready the resources in the selected chipcards by at least one of reserving memory areas, occupying memory areas, and loading software resources; and the management module is configured to store in the data store for a respective chipcard information about at least one of memory areas reserved, memory areas occupied, memory areas free, and software resources loaded.

11. The system according to claim 8, wherein the data store is configured to store information about software resources and hardware resources available in each of the chipcards, the information about software resources including at least information about one of cryptographic keys, cryptographic functions, and other software programs available in the respective chipcard, and the information about hardware resources including at least information about one of memory size, interfaces, and processors available in the respective chipcard.

12. The system according to claim 8, wherein the system includes an application management unit configured to receive from a communication terminal an application request and a module identification identifying one or more than one selected chipcards, and to transmit the first resource management instruction to the resource management centre, based on the received application request, the first resource management instruction including a resource user identification; and the management module includes means for storing in the data store the resource user identification in a way assigned to the module identification.

13. The system according to claim 12, wherein the resource management centre includes a confirmation module configured to transmit a resource preparation confirmation to the application management unit; the application management unit includes an application instruction module configured to transmit an application installation request via the telecommunication network to one or more than one selected chipcards; the resource control mechanism includes means for installing an application in the selected chipcards in accordance with the application installation request and using the prepared resources; and the application management unit includes an application management module configured to store information about the installed application, the information being stored assigned to the module identifications.

14. The system according to claim 8, wherein the management instruction module includes means for inserting an application installation request into the second resource management instruction; the resource control mechanism includes means for installing an application in the respective chipcard in accordance with the application installation request; and the management module includes means for storing information about the installed application, the information being stored in the data store, assigned to the respective chipcards.

* * * * *